US005272650A

United States Patent [19]

Adams et al.

[11] Patent Number: 5,272,650

[45] Date of Patent: Dec. 21, 1993

[54] SELF CORRECTING TIME BASE FOR INACCURATE OSCILLATORS

[75] Inventors: John T. Adams, Minneapolis; Kenneth B. Kidder; Timothy M. Tinsley, both of Coon Rapids, all of Minn.

[73] Assignee: Honeywell Inc., Minneapolis, Minn.

[21] Appl. No.: 587,717

[22] Filed: Sep. 25, 1990

[51] Int. Cl.[5] ..................................... G06F 15/20

[52] U.S. Cl. ..................................... 364/571.01; 331/1 A; 364/569; 377/50

[58] Field of Search ..................................... 331/1 A, 10, 14; 364/550, 569, 571.01; 377/50

[56] References Cited

U.S. PATENT DOCUMENTS

| | | | |
|---|---|---|---|
| 3,364,439 | 1/1968 | Cohen et al. | 331/1 A |
| 3,555,446 | 1/1971 | Braymer | 331/14 X |
| 3,568,083 | 3/1971 | Harzer | 331/14 X |
| 3,689,849 | 9/1972 | Swanson et al. | 331/1 A |
| 3,883,863 | 5/1975 | Willard | 364/574 X |
| 3,936,739 | 2/1976 | Hogg | 377/50 |
| 4,044,314 | 8/1977 | Sosin | 331/1 A |
| 4,470,025 | 9/1984 | Baker | 331/1 A X |

*Primary Examiner*—Edward R. Cosimano
*Attorney, Agent, or Firm*—Robert B. Leonard

[57] ABSTRACT

An apparatus and method for providing a microprocessor having an inaccurate oscillator with a desired time base. The cycles of the output signal of the oscillator are counted by a first counter until the counted number equals a predetermined correction count. The first counter then produces a timing signal. A second counter is set up to create an actual count indicative of the number of output signals occurring during a predetermined number of periods of an AC signal generator connected to the microprocessor. A predetermined desired count is then subtracted from the actual count to produce a difference count. The difference count is then added to the old correction count to create a new correction count. By iterating this process until the difference count is equal to zero, the timing signal is modified until it is equal to the desired time base.

4 Claims, 3 Drawing Sheets

SELF CORRECTING TIME BASE FOR INACCURATE OSCILLATORS

BACKGROUND OF THE INVENTION

This invention is directed toward the field of microprocessors, and more specifically toward microprocessors with internal oscillators.

In many microprocessor applications, accurate time bases are necessary to provide proper control functions. Microprocessors, in general, include an integrated oscillator which can be used to provide a desired time base. However, the integrated oscillators can be inaccurate, thus by itself, it may not be able to provide the necessary timing functions for the microprocessor. Still, in order for microprocessor based products to be cost competitive, it is necessary to find ways to use these internal oscillators since more accurate external oscillators are relatively expensive.

Thus, it is an object of the present invention to provide an accurate time base by using the integrated oscillator on a microprocessor.

SUMMARY OF THE INVENTION

The present invention is a method and an apparatus for making an inaccurate microprocessor oscillator produce an accurate desired time base. A correction means performs an iterative process based on the frequency of an AC signal source, such as an AC power supply connected to the microprocessor. First, a desired time base is selected. Output cycles from an integrated oscillator are counted by a first counter until the counted number of cycles is equal to a calculated correction count stored in ROM. The initial correction count is equal to the desired time base divided by the period of the signal from the oscillator. Then, the first counter produces an output pulse. A second counter connected to the first counter and the AC signal source counts the output pulses from the first counter during a predetermined number of cycles from the AC signal source and produces a second count. This second count is then subtracted from a desired count, the difference then being added to the correction count. The desired count is equal to the product of the predetermined number of cycles of the signal generator times the period of the signal generator divided by the ideal period of the internal oscillator. This process is repeated, until the output of the first counter reaches the desired frequency. By manipulating the count at which the first counter produces an output signal, an accurate time base is produced.

DETAILED DESCRIPTION OF THE PREFERRED EMBODIMENT

Figure 1:
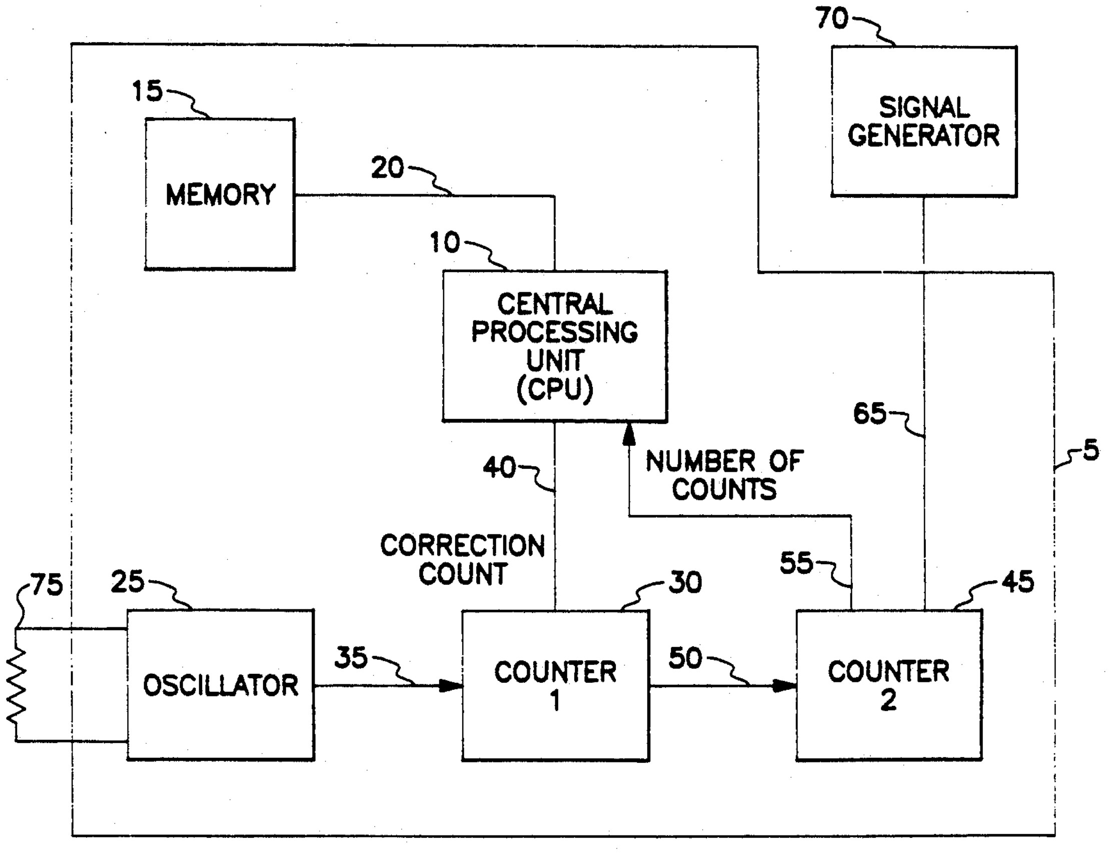
FIG. 1 is a block diagram of the microprocessor.
Figure 2:
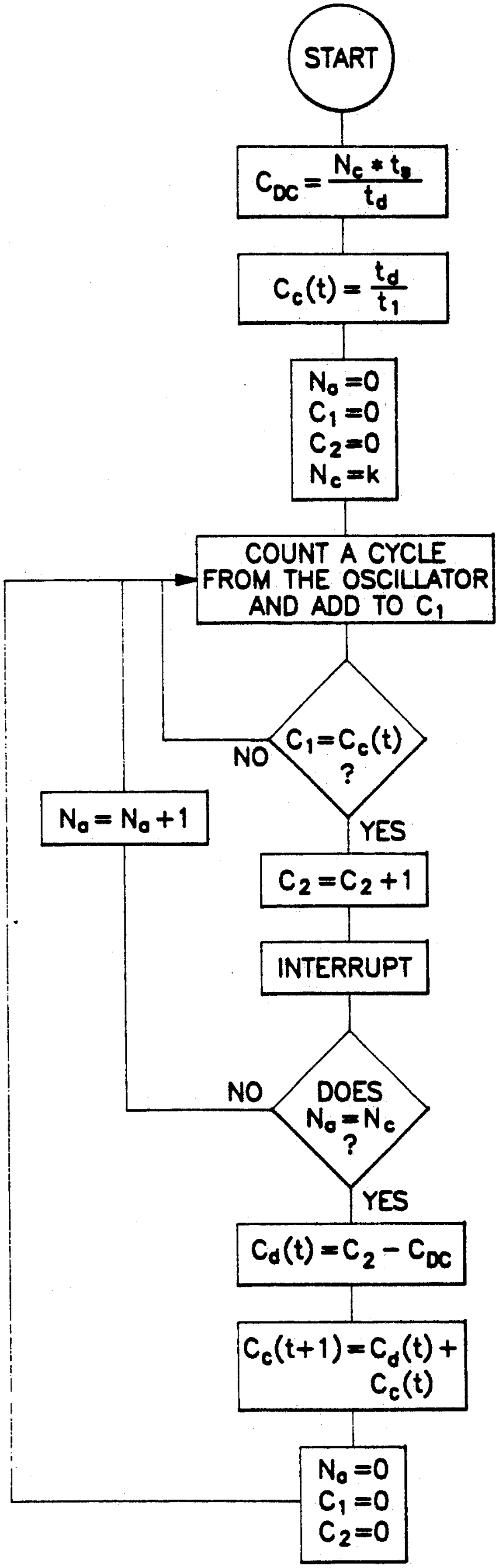
FIG. 2 is a flow chart of the steps performed in the inventive method.

The following description of the inventive microprocessor system can be better understood with reference to FIGS. 1 and 2. For this embodiment, a 68HC05P1 microprocessor is used for explanatory purposes.

A block diagram of the exemplary microprocessor 5 is shown in FIG. 1. Microprocessor 5 includes central processing unit (CPU) 10, memory 15, oscillator 25, first counter 30, second counter 45, and paths 20, 35, 40, 50, 55 and 65 and resistor 75.

CPU 10 controls the operation of the microprocessor 5. The CPU is responsible for fetching instructions and data from memory 15 via path 20, and for executing operations based on the fetched instructions.

Memory 15 may be comprised of read only memory (ROM) and random access memory (RAM). The memory stores preprogrammed instructions for the CPU which are delivered to the CPU on request. In addition, the memory stores data received from data sources (not shown) outside the microprocessor 5 and the results of calculations performed by the CPU.

In order for the microprocessor to operate properly, a common time base for all elements of the microprocessor must be established. To this end oscillator 25 is included in the microprocessor. The microprocessor produces a cyclical output signal having a period $t_1$ and a frequency $f_1$. Resistor 75 is connected to oscillator 25. The oscillator may include prescalers (not shown) to modify the frequency of the output signal. Generally, oscillator 25 can be inaccurate. To provide a more accurate time base for some microprocessor functions, the following inventive method can be performed on and the inventive apparatus can be included in the microprocessor.

A first counter 30 receives output signals from oscillator 25, through path 35, and counts the number of signal cycles ($c_1$) from the oscillator. When the number of counted cycles equals a correction count ($C_c(t)$), the first counter 30 produces a first output signal.

$C_c(t)$ is a number stored in memory 15 after being calculated by CPU 10. Initially $C_c(t)$ is calculated by an engineer and stored in ROM. To calculate $C_c(t)$, a desired time base $t_d$ is divided by $t_1$. Therefore $C_c(t)$ is calculated in the CPU. Once calculated, the correction count is stored in memory 15 via path 20 and sent to first counter 30 via path 40.

First counter 30 is connected to second counter 45 through path 50. Second counter 45 receives the first output signal via path 50, and counts the number of first output signal cycles ($C_2$) occurring while the second counter is concurrently counting a number of cycles ($N_a$) of an AC signal source 70. For this embodiment, the AC signal source was an AC power supply which is more accurate than the internal oscillator. The AC signal source produces a signal having a period $t_s$ and frequency $f_s$. $C_2$ continues to be counted until $N_a$ reaches a preselected count ($N_c$). Second counter 45 then sends $C_2$ to the CPU 10 and memory 15 via path 55.

The CPU then creates a difference count ($C_d(t)$) which is equal to $C_2$ minus a desired count. The desired count, $C_{DC}$, can be calculated before construction of the microprocessor's program, and is determined using the following formula:

$$\frac{N_c * t_s}{t_d} = C_{DC}$$

$N_c$, $t_s$ and $t_d$ are variables which can be selected to meet design needs.

Once the $C_d(t)$ is calculated, a new correction count $C_c(t+1)$ is created by adding $C_d(t)$ to $C_c(t)$. This new correction count is then used by first counter 30 in a next iteration of the process. The process is repeated until $C_d(t)$ is equal to zero, at which point first counter 30 is producing an output signal having a period of $t_d$ and frequency $f_d$. At this point, the correction can be terminated if desired. Otherwise the correction can be continued to correct for variations in oscillator output due to time and temperature.

A flow chart showing the above described method is shown in FIG. 2. Note that the box marked "INTERRUPT" is triggered by the AC signal source completing one cycle. It should be noted that the inventive method could be performed by an external process or before the microprocessor is installed in a product. It is not then necessary for the microprocessor to carry any of the code used to perform the method.

As an example, assume it is desirable to have a microprocessor with an internal time base $t_d=0.5$ msec. To self calibrate the microprocessor's time base, a comparison can be made as earlier described between the line frequency and the time base being generated. If the power supply is producing a $f_s=60$ Hz, setting $N_c$=three line cycles of the power supply and totals 50 msec or 100 times the desired time base.

$$\frac{1\text{ sec}}{60\text{ cycles}} = 16.67\frac{\text{ms}}{\text{cycle}} = t_s$$

$$16.67 = \frac{\text{ms}}{\text{cycle}} * 3\text{ cycles} = 0.5\text{ msec} * C_{DC}\text{ or}$$

$$\frac{50\text{ msec}}{.5\text{ msec}} = C_{CD} = 100\text{ counts}$$

If the oscillator 25 were running at 2 microseconds, a 0.5 msec signal could be generated by counting out 250 clock cycles of oscillator 25:

$$\frac{2\text{ microseconds}}{\text{count}} * 250\text{ counts} = .5\text{ msec}$$

Now assume that the microprocessor's frequency is 25% fast. The oscillator's time base is then =2.5 microseconds (2 microseconds×1.25). 2.5 microseconds×250 counts=0.625 seconds. Use this 0.625 microsecond base to count the number of times it occurs in 3-60 Hz line cycles (0.05 sec).

$$\frac{.05\text{ sec}}{.625\frac{\text{msec}}{\text{count}}} = 80\text{ counts}$$

What is desired is to get 100 counts during that period. To achieve this result, subtract the desired count (100) from the count just determined (80) to get −20. Add the −20 to the 250 count starting point to get 230. Now use this for a latest corrected value of the time base and count out 3 more line cycles. Then repeat the calculations. This method will slowly iterate to an accurate time base. Advantages of using this method are:

1) when errors are small, only small corrections are made. This reduces jitter and instability in the system.
2) when errors are large, big steps are made to take care of the error quickly.

The following table shows how the method produces a desired time base signal.

| Base Freq. | Correction Count | Base x Correction | No. of Counts In .05 secs. | Difference Count | New Correction Count |
|---|---|---|---|---|---|
| 2.5 micro secs. | 250 | .625 | 80 | 80 − 100 = −20 | 250 − 20 = 230 |
| | 230 | .575 | 87 | 87 − 100 = −13 | 230 − 13 = 217 |
| | 217 | .5425 | 92 | 92 − 100 = −8 | 217 − 8 = 209 |
| | 209 | .5225 | 96 | 96 − 100 = −4 | 209 − 4 = 205 |
| | 205 | .5125 | 98 | 98 − 100 = −2 | 205 − 2 = 203 |
| | 203 | .5075 | 99 | 99 − 100 = −1 | 203 − 1 = 202 |
| | 202 | .505 | 99 | 99 − 100 = −1 | 202 − 1 = 201 |
| | 201 | .5025 | 99 | 99 − 100 = −1 | 201 − 1 = 200 |
| | 200 | .5 | 100 | 100 − 100 = 0 | 200 − 0 = 200 |
| | | | | Correction for this base frequency is achieved | |

With reference to FIG. 2, thereshown is a flow chart of the inventive method. After the method starts at block 200, it sets $C_{dc}$ equal to $N_c*t_s$ divided by $t_d$ at block 205 as those terms are defined above. Next, the method set $C_c(t)$ equal to td divided by $t_1$ at block 210. Next $N_a$, $C_1$, $C_2$ are set equal to zero and $N_c$ is set equal to K at block 215. Then, the method counts a cycle from the oscillator and adds to $C_1$ at block 220. At block 225, $C_1$ is compared to $C_c(t)$. If the two are not equal, the method returns to block 220. If the two are equal, then $C_2$ is set equal to $C_2+1$ at block 230 and the microprocessor is interrupted at block 235. Next, at block 240, the method determines whether $N_a$ is equal to $N_c$. If not, $N_a$ is set equal to $N_a+1$ and the method is returned to block 220. If so, $C_d(t)$ is set equal to $C_2-C_{dc}$ at block 245. Then, the method moves to block 250 where $C_c(t+1)$ is set equal to $C_d(t)+C_c(t)$. Lastly, at block 255 $N_a$, $C_1$ and $C_2$ are set equal to zero and the method returns to block 220.

Figure 3:
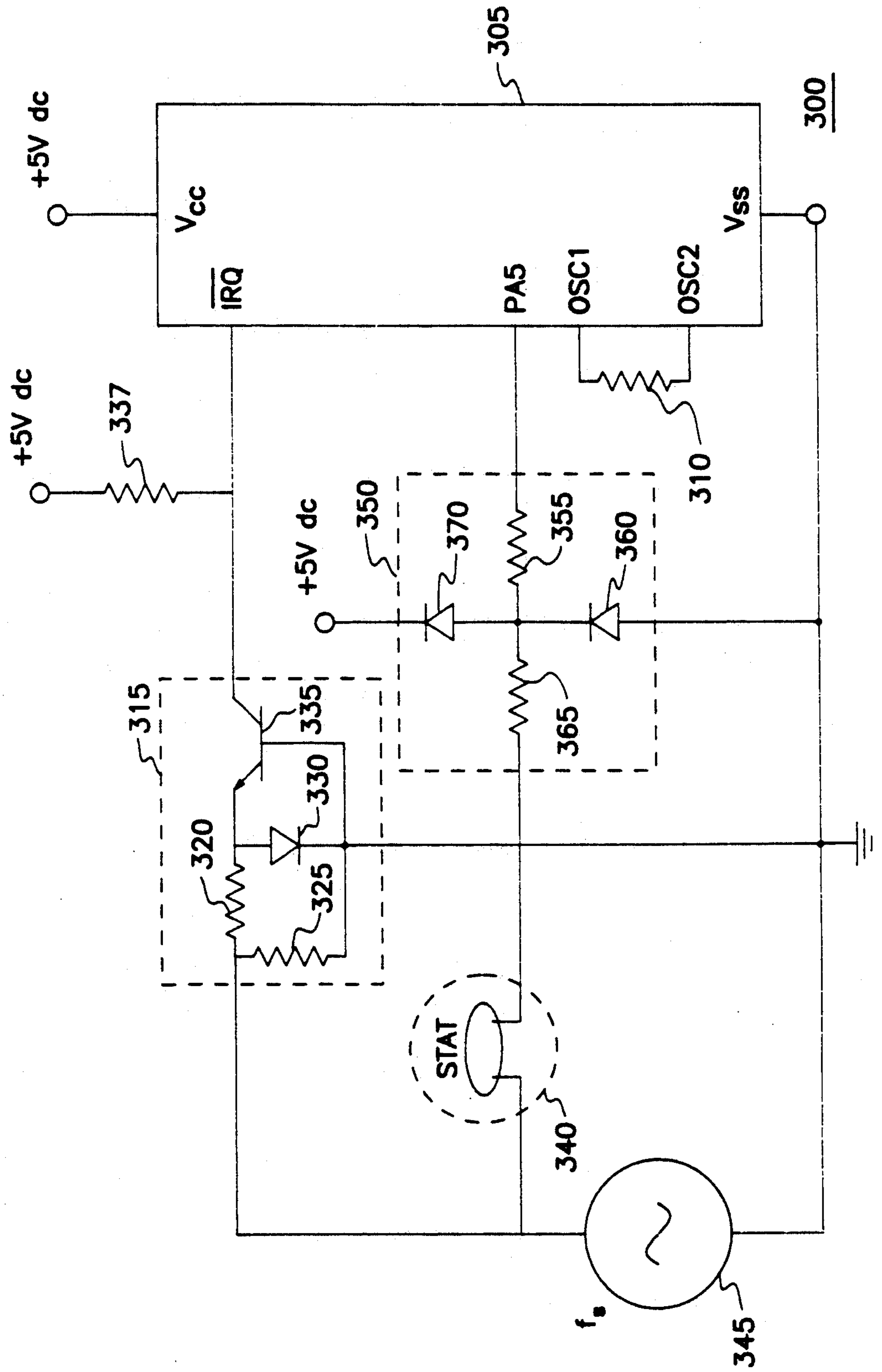
FIG. 3 is a schematic diagram of the inventive microprocessor system in a furnace control system.

One use for such a microprocessor is in a temperature control system. Shown in FIG. 3 is a temperature control system 300. Temperature control system 300 is comprised of microprocessor 305 having the inventive time base correction means (not shown), power supply 345, thermostat 340, signal generator 315 and wave clipper 350.

Microprocessor 305 includes the same elements as microprocessor 5 of FIG. 1. In addition, microprocessor 305 contains an interrupt request port (IRQ), a thermostat input port (PA5) and oscillator ports OSC1 and OSC2. The IRQ port causes the CPU to pause when either a rising or falling edge is created by square wave generator 315. The IRQ port is used to sense the cycles of the AC power supply and each interrupt causes $N_a$ to increment by one.

The signal generator 315 is comprised of transistor 335 having a base, collector and emitter, diode 330 having an anode and a cathode, and resistors 320, 325 and 337 each having first and second ends. The first ends of the resistors 320 and 325 are tied together and to the AC power supply, while the second end of resistor 320 is tied to the anode of diode 330 and the emitter of transistor 335. The second end of resistor 325 is tied to the cathode of diode 330, the base of transistor 335 and one side of the AC power supply, all of which for this embodiment are tied to ground. The collector of transistor 335 is tied to the IRQ port of the microprocessor 305 and to 5 Vdc through resistor 337. The signal generator is used to produce a wave which is easier to use for counting cycles of the AC power supply.

Thermostat 340 is tied to power supply 345 and to wave clipper 350. A current flowing through thermostat 340 from power supply 345 is clipped by wave clipper 350 before it reaches microprocessor 305. The thermostat identifies for the microprocessor that a space is not at a desired temperature and that heating or cooling must occur.

Wave clipper 350 includes two resistors 355, 365 connected in series between thermostat 340 and the PA5 port. Diodes 360 and 370 are connected in series between a DC source compatible with the microprocessor +5 Vdc source and ground, the connection between the two diodes being tied to the connection between the two resistors.

Lastly, resistor 310 is connected between the OSC1 and OSC2 ports. By changing the size of resistor 310, the output frequency of the internal oscillator 25 of FIG. 1 can be changed.

The foregoing has been a description of a novel, and non-obvious microprocessor apparatus and method for providing an accurate time base using an inaccurate oscillator integrated as part of the microprocessor. The inventors do not intend that their invention be limited to the foregoing description, but instead they define their invention in the claims appended hereto.

We claim:

1. A method of producing an accurate timing signal from the output signal of an inaccurate oscillator contained in a microprocessor, comprising the steps of:

(a) generating a correction count;

(b) counting cycles of the output signal of the inaccurate oscillator until the counted number of cycles equals said correction count and then producing a timing signal;

(c) counting said timing signals during a predetermined number of cycles of a signal generator;

(d) producing an actual count indicative of the number of timing signals counted during said predetermined number of cycles;

(e) creating a difference value equal to said actual count during said first predetermined number of cycles minus a desired count;

(f) creating a new correction count which is equal to the difference count plus the correction count; and (g) repeating steps (b) through (f) until the difference value is equal to a second predetermined number, said timing signal thereby being modified.

2. A temperature control system adapted to operate a plant for manipulating space temperature, the plant and system connected to an AC power supply, comprising:

a microprocessor connected to the plant and the AC power supply, said microprocessor causing and ceasing operation of the plant, comprising:

an internal oscillator having an output port for producing an output signal;

a first counter having input and output ports, said input port being electrically connected to said output port of said internal oscillator, said first counter producing a first actual count representative of counted cycles of said output signal, said counter further producing a timing signal when said actual count equals a predetermined correction count;

a second counter having an output port and an input port, said input port in electrical communication with said first counter and the AC power supply, said second counter counting cycles of the AC power supply and producing a second actual count which is indicative of the number of timing signals produced by said first counter during a predetermined number of cycles from the AC power supply;

a central processor unit connected to the output port of said second counter producing a new correction count, said central processor unit producing a difference count equal to said actual count minus a predetermined desired count, said new correction count being equal to a previous correction count plus said difference count, said microprocessor causing repetition of calculation of said new correction count such that said timing signal approaches a desired time base; and a temperature sensor connected to said microprocessor, said microprocessor storing a desired temperature associated with a time, said desired temperature changing the time, said microprocessor operating said plant until said desired temperature has been sensed by said temperature sensor.

3. The system of claim 2, wherein said microprocessor further includes an interrupt request port connected to the power supply and being adapted to pause the microprocessor upon the occurrence of a preselected event; and said system further comprises:

a signal generator connected between the power supply and the interrupt request port, said signal generator producing a square wave, and said preselected event is a preselected edge of said square wave.

4. A microprocessor connected to an AC signal source, comprising:

an internal oscillator having an input port and an output port, said internal oscillator producing an output signal;

a first counter having input and output ports, said input port being electrically connected to said output port of said internal oscillator, said counter producing an actual count representative of counted cycles of said output signal, said first counter further producing a timing signal when said actual count equals a predetermined correction count;

a second counter having an output port and an input port, said input port in electrical communication with said first counter and the AC power supply, said second counter counting cycles of the AC power supply and producing an actual count which is indicative of the number of timing signals produced by said first counter during a predetermined number of cycles from the AC signal source; and a central processor unit connected to the output port of said second counter for producing a new correction count, said central processor unit producing a difference count equal to said actual count minus a predetermined desired count, said new correction count being equal to a previous correction count plus said difference count, said central processor unit also being connected to said first counter and providing said new correction count to said first counter, said first counter thereby producing a different timing signal.

* * * * *